US010373419B1

(12) United States Patent
Smithson et al.

(10) Patent No.: US 10,373,419 B1
(45) Date of Patent: Aug. 6, 2019

(54) INTEGRATED LOCKING MECHANISM WITH ELECTRONIC NOTIFICATION AND BILLING

(71) Applicant: LOCKED n' LOADED LLC, Rogers, AR (US)

(72) Inventors: Michele Smithson, Rogers, AR (US); Wesley Noel Smithson, Rogers, AR (US); Anna Marie Smithson, Rogers, AR (US); Guilherme Soares Silvia de Andrade, Rogers, AR (US)

(73) Assignee: LOCKED n' LOADED LLC, Rogers, AR (US)

( * ) Notice: Subject to any disclaimer, the term of this patent is extended or adjusted under 35 U.S.C. 154(b) by 0 days.

(21) Appl. No.: 15/788,085

(22) Filed: Oct. 19, 2017

(51) Int. Cl.

| | |
|---|---|
| ***G06Q 20/26*** | (2012.01) |
| ***G06Q 20/34*** | (2012.01) |
| ***G07F 17/20*** | (2006.01) |
| ***D06F 37/42*** | (2006.01) |
| ***G06Q 20/08*** | (2012.01) |

(52) U.S. Cl.
CPC .............. *G07F 17/20* (2013.01); *D06F 37/42* (2013.01); *G06Q 20/085* (2013.01); *G06Q 20/26* (2013.01); *G06Q 20/349* (2013.01)

(58) Field of Classification Search
CPC .... G07F 17/20; G06Q 20/085; G06Q 20/349; G06Q 20/26; D06F 37/42
See application file for complete search history.

(56) References Cited

U.S. PATENT DOCUMENTS

| | | | | |
|---|---|---|---|---|
| 4,999,763 A * | 3/1991 | Ousborne | B60S 3/04 134/123 |
| 5,655,394 A | 8/1997 | DiRocco, Jr. | |
| 5,771,717 A * | 6/1998 | Broker | D06F 39/14 68/12.26 |
| 6,784,801 B2 | 8/2004 | Watanabe et al. | |
| 2002/0065770 A1 * | 5/2002 | Ebata | G06Q 20/10 705/39 |

FOREIGN PATENT DOCUMENTS

| | | |
|---|---|---|
| WO | WO 2011/095567 | 8/2011 |

* cited by examiner

*Primary Examiner* — Sonji N Johnson
(74) *Attorney, Agent, or Firm* — Seyfarth Shaw LLP

(57) ABSTRACT

A communal appliance machine with an integrated locking system and a method of operation thereof is provided. The integrated locking systems include a locking mechanism, a user information reader associated with the locking mechanism, a wireless notification module, and a payment card charging module. A processor is communicatively linked to the locking mechanism, the user information reader, the wireless notification module, and the payment card charging module. The processor is configured to receive user information or payment card information from the payment card reader, send a lock signal to the locking mechanism at an appropriate time, send an unlock signal to the locking mechanism at an appropriate time, generate the use information of the machine, and forward the use information of the machine to the payment card charging module.

19 Claims, 4 Drawing Sheets

INTEGRATED LOCKING MECHANISM WITH ELECTRONIC NOTIFICATION AND BILLING

FIELD OF TECHNOLOGY

The present invention relates to the field of integrated locking mechanisms. Specifically, the invention relates to an integrated electronic locking mechanism for use in commercial products including, for example, commercial appliances.

BACKGROUND

Commercial appliances in communal settings allow a large number of individuals to use these appliances to accomplish their desired objectives. For example, laundromats allow individuals to wash and dry their clothes or microwaves in a communal kitchen allows individuals to cook their food. These communal appliances can also be accessed in settings such as hotels, dormitories, and apartments. However, these communal appliances fail to meet the needs of the individuals using these appliances. In addition, the communal appliances also fail to optimize the resources provided to the individuals.

Presently, the use of these communal appliances does not provide sufficient security for the first individual from other individuals looking to utilize these resources. These communal appliances fail to prevent other individuals from removing the first individual's belongings to utilize the appliances for the other individual's personal use. Further, the communal appliances do not prevent other from stealing the first user's belongings.

In addition, the owners of these communal appliances are not able to maximize the profitability of the appliance should a user forget they are occupying the appliance. This occupation of the appliances prevents another user from utilizing the resources and prevents the owners from making additional profit from appliances.

SUMMARY

The present invention encompasses an integrated locking system operatively connected to a commercial appliance, for example, a communal appliance machine. According to one embodiment, the integrated locking system includes a locking mechanism associated with a communal appliance machine configured to remain in a locked state until an unlock signal is received to allow the communal appliance machine to engage in an unlocked state. According to another embodiment, the integrated locking system includes a locking mechanism associated with a door of the communal appliance machine configured to hold the door closed until an unlock signal is received when in a locked state to allow the door to open freely until a lock signal is received when in an unlocked state.

In another embodiment, the invention encompasses a user information reader associated with the communal appliance machine. In certain embodiments, the invention encompasses a user information reader associated with the locking mechanism. In another embodiment, the user information reader receives payment card information, for example from a credit card or other payment means. In other embodiments, the user information reader receives user information, for example from an identification card or access card, which verifies the user's eligibility to use the communal appliance machine or which otherwise records user information relating to who uses the communal appliance machine.

In another embodiment, the invention encompasses a wireless notification module that determines a current operating state of the communal appliance machine and notifies one or more external communication devices of the current operating state of the communal appliance machine.

In another embodiment, the integrated locking mechanism includes a payment card charging module that charges fees to the payment card based on use information of the communal appliance machine.

In another embodiment, a processor is communicatively linked to the locking mechanism, the user information reader, the wireless notification module, or the payment card charging module, or a combination thereof. In certain embodiments, the processor is programmed to receive payment card information or user information from the user information reader. In other embodiments, the processor is programmed to send a lock signal to the locking mechanism when the payment card information or user information is received while the locking mechanism is in an unlocked state. In other embodiments, the processor is programmed to store the received payment card information or user information. In other embodiments, the processor is programmed to delete the received payment card information or user information after the use has ended. In certain embodiments, the processor is programmed initiate an operation cycle of the communal appliance machine. In certain embodiments, the processor is programmed to send an unlock signal to the locking mechanism when the payment card information or user information received matches the stored payment card information or user information when the locking mechanism is in a locked state. In other embodiments, the processor is programmed to generate use information of the communal appliance machine. In other embodiments, the processor is programmed to forward the use information of the communal appliance machine to the payment card charging module or to one or more external communication devices.

According to another embodiment of the invention, the current operating state of the communal appliance machine can switch between an active state, wherein the appliance is currently operating, or a storage state, wherein the appliance is not currently operating.

According to a further embodiment, the use information of the communal appliance machine comprises a number of operating cycles completed by the communal appliance machine and an amount of time the communal appliance machine is in the storage state before an unlock signal is sent by the processor.

In addition, according to another embodiment of the present invention, the wireless notification module notifies one or more external communication devices when there is a change in the operating state of the communal appliance machine.

Another embodiment of the invention includes an integrated laundry machine locking system in a laundry machine. In certain embodiments, the integrated laundry machine locking system includes a locking mechanism associated with, for example, a door of the laundry machine. In one embodiment, that locking mechanism holds the door closed until an unlock signal is received when the locking mechanism is in a locked state and allows the door to open freely until a lock signal is received when the locking mechanism is in an unlocked state.

In another embodiment, the integrated laundry machine locking system also includes a user information reader associated with the locking mechanism. In certain embodiments, the user information reader associated with the locking mechanism receives a payment card and payment card information associated with the payment card. In other embodiments, the user information reader receives user information, which verifies the user's eligibility to use the laundry machine or which otherwise records user information relating to who uses the laundry machine.

In other embodiments, the invention encompasses a wireless notification module that determines a current operating state of the laundry machine and/or notifies one or more external communication devices of the current operating state of the laundry machine.

In another embodiment, the integrated laundry machine locking system includes a payment card charging module that charges fees to the payment card, for example, based on use information of the laundry machine.

In certain embodiments, the system includes a processor that is communicatively linked to the locking mechanism, the user information reader, the wireless notification module, or the payment card charging module, or combinations thereof. In certain embodiments, the processor is programmed to process one or more of the following: to receive payment card information or user information from the user information reader; send a lock signal to the locking mechanism when the payment card information or user information is received while the locking mechanism is in an unlocked state; store the received payment card information or user information; initiate an active cycle of the laundry machine; send an unlock signal to the locking mechanism when the stored payment card information or user information is received while the locking mechanism is in a locked state; generate the use information of the laundry machine; or forward the use information of the laundry machine to the payment card charging module or to one or more external communication devices, and combinations thereof.

In certain embodiments, the current operating state of the laundry machine can switch between an active state, wherein the appliance is currently operating, or a storage state, wherein the appliance is not currently operating.

In another embodiment, the use information of the laundry machine comprises a number of cycles completed by the laundry machine and an amount of time the laundry machine is in the storage state before an unlock signal is sent by the processor.

According to a further embodiment of the invention, the wireless notification module may be configured, for example, to notify one or more external communication devices when there is a change in the operating state of the communal appliance machine.

Another embodiment includes a method of operating a communal appliance machine. In certain embodiments, the method includes receiving payment card information or user information from a user information reader. In another embodiment, the method includes sending a lock signal to a locking mechanism when the payment card information or user information is received while the locking mechanism is in an unlocked state, In another embodiment, the method includes storing the received payment card information or user information and initiating an active cycle of the communal appliance machine. In another embodiment, the method includes determining a current operating state of the communal appliance machine. In another embodiment, the method includes notifying one or more external communication devices of the current operating state of the communal appliance machine. In another embodiment, the method includes sending an unlock signal to the locking mechanism when the payment card information or user information that is received matches the stored payment card information or user information when the locking mechanism is in a locked state. In another embodiment, the method includes generating use information of the communal appliance machine. In another embodiment, the method includes forwarding the use information of the communal appliance machine to a payment card charging module or to one or more external communication devices. In another embodiment, the method includes charging a payment card associated with the payment card information based on use information of the communal appliance machine. In another embodiment, the method includes recording the use information of the communal appliance machine associated with the user information.

In certain embodiments, the invention encompasses an integrated locking system operatively connected to a communal appliance machine, comprising a locking mechanism associated with a communal appliance machine configured to hold the communal appliance machine closed until an unlock signal is received when in a locked state and allow the communal appliance machine to open freely until a lock signal is received when in an unlocked state; a user information reader associated with the locking mechanism configured to receive user information; a wireless notification module configured to determine a current operating state of the communal appliance machine and notify one or more external communication devices of the current operating state of the communal appliance machine; and a processor communicatively linked to the locking mechanism, the user information reader, and the wireless notification module, the processor configured to: receive user information from the user information reader; send a lock signal to the locking mechanism when the user information is received while the locking mechanism is in an unlocked state; initiate an active cycle of the communal appliance machine; generate the use information of the communal appliance machine; and forward the use information of the communal appliance machine to the wireless notification module.

In certain embodiments of the integrated locking system, the current operating state of the communal appliance machine comprises an active state, wherein the communal appliance machine is currently operating, and a storage state, wherein the communal appliance machine is not currently operating.

In certain embodiments of the integrated locking system, the current operating state of the communal appliance machine further comprises a remaining amount of time in a current active cycle of the communal appliance machine.

In certain embodiments of the integrated locking system, the use information of the communal appliance machine comprises a number of active cycles completed by the communal appliance machine and an amount of time the communal appliance machine is in the storage state before an unlock signal is sent by the processor.

In certain embodiments of the integrated locking system, the wireless notification module is further configured to notify one or more external communication devices when there is a change in the operating state of the communal appliance machine.

In certain embodiments of the integrated locking system, the user information from the user information reader is stored.

In certain embodiments of the integrated locking system, the processor will keep the locking mechanism in a locked state until user information matching the stored user information is received.

In certain embodiments of the integrated locking system, the communal appliance machine is selected from the group consisting of a washing machine, a dryer, a combined washing machine and dryer, and a microwave.

In another embodiment, the invention encompasses an integrated locking system operatively connected to a communal appliance machine, comprising: a locking mechanism associated with a communal appliance machine configured to hold the communal appliance machine closed until an unlock signal is received when in a locked state and allow the communal appliance machine to open freely until a lock signal is received when in an unlocked state; a user information reader associated with the locking mechanism configured to receive payment card information; a wireless notification module configured to determine a current operating state of the communal appliance machine and notify one or more external communication devices of the current operating state of the communal appliance machine; a payment card charging module configured to charge fees to a payment card associated with the payment card information; and a processor communicatively linked to the locking mechanism, the user information reader, the wireless notification module, and the payment card charging module, the processor configured to: receive payment card information from the user information reader; store the received payment card information; send a lock signal to the locking mechanism when the payment card information is received while the locking mechanism is in an unlocked state; initiate an active cycle of the communal appliance machine; generate the use information of the communal appliance machine; forward the use information of the communal appliance machine to the wireless notification module; forward the use information of the communal appliance machine to the payment card charging module; and send an unlock signal to the locking mechanism when the payment card information that is received matches the stored payment card information when the locking mechanism is in a locked state.

In certain embodiments of the integrated locking system, the current operating state of the communal appliance machine comprises an active state, wherein the communal appliance machine is currently operating, and a storage state, wherein the communal appliance machine is not currently operating.

In certain embodiments of the integrated locking system, the current operating state of the communal appliance machine further comprises a remaining amount of time in a current active cycle of the communal appliance machine.

In certain embodiments of the integrated locking system, the use information of the communal appliance machine comprises a number of active cycles completed by the communal appliance machine and an amount of time the communal appliance machine is in the storage state before an unlock signal is sent by the processor.

In certain embodiments of the integrated locking system, the wireless notification module is further configured to notify one or more external communication devices when there is a change in the operating state of the communal appliance machine.

In certain embodiments of the integrated locking system, the payment card charging module charges a fee to the payment card associated with the payment card information based on use information of the communal appliance machine.

In certain embodiments of the integrated locking system, the communal appliance machine is selected from the group consisting of a washing machine, a dryer, a combined washing machine and dryer, and a microwave.

In another embodiment, the invention encompasses a laundry machine comprising an integrated laundry machine locking system, comprising: a locking mechanism associated with a laundry machine configured to hold the laundry machine closed until an unlock signal is received when in a locked state and allow the laundry machine to open freely until a lock signal is received when in an unlocked state; a user information reader associated with the locking mechanism configured to receive user information or payment card information; a wireless notification module configured to determine a current operating state of the laundry machine and notify one or more external communication devices of the current operating state of the laundry machine; a payment card charging module configured to charge fees to a payment card associated with the payment card information based on use information of the laundry machine; and a processor communicatively linked to the locking mechanism, the user information reader, the wireless notification module, and the payment card charging module, the processor configured to: receive payment card information from the user information reader; store the received payment card information; send a lock signal to the locking mechanism when the user information is received while the locking mechanism is in an unlocked state; send a lock signal to the locking mechanism when the payment card information is received while the locking mechanism is in an unlocked state; initiate an active cycle of the laundry machine; generate the use information of the laundry machine; forward the use information of the laundry machine to the wireless notification module; forward the use information of the laundry machine to the payment card charging module; and send an unlock signal to the locking mechanism when the payment card information that is received matches the stored payment card information when the locking mechanism is in a locked state; wherein the current operating state of the laundry machine, comprises an active state, wherein the laundry machine is currently operating, and a storage state, wherein the laundry machine is not currently operating; or an amount of time remaining until a current operation cycle is complete; and wherein the use information comprises a number of laundering cycles completed by the laundry machine or an amount of time the laundry machine is in the storage state before an unlock signal is sent by the processor.

In certain embodiments of the laundry machine, the wireless notification module is further configured to notify one or more external communication devices when there is a change in the operating state of the laundry machine.

In certain embodiments of the laundry machine, the payment card charging module charges a fee to the payment card associated with the payment card information based on use information of the laundry machine.

In certain embodiments of the laundry machine, the use information of the laundry machine comprises the amount of time the laundry machine is in the storage state before an unlock signal is sent by the processor.

In certain embodiments of the laundry machine, the laundry machine is selected from the group consisting of a washing machine, a dryer, and a combined washing machine and dryer.

BRIEF DESCRIPTION OF THE DRAWINGS

The features, nature, and advantages of the present disclosure will become more apparent from the detailed description set forth below when taken in conjunction with the drawings in which like reference characters identify correspond aspects throughout.

DETAILED DESCRIPTION OF EMBODIMENTS

Figure 1:
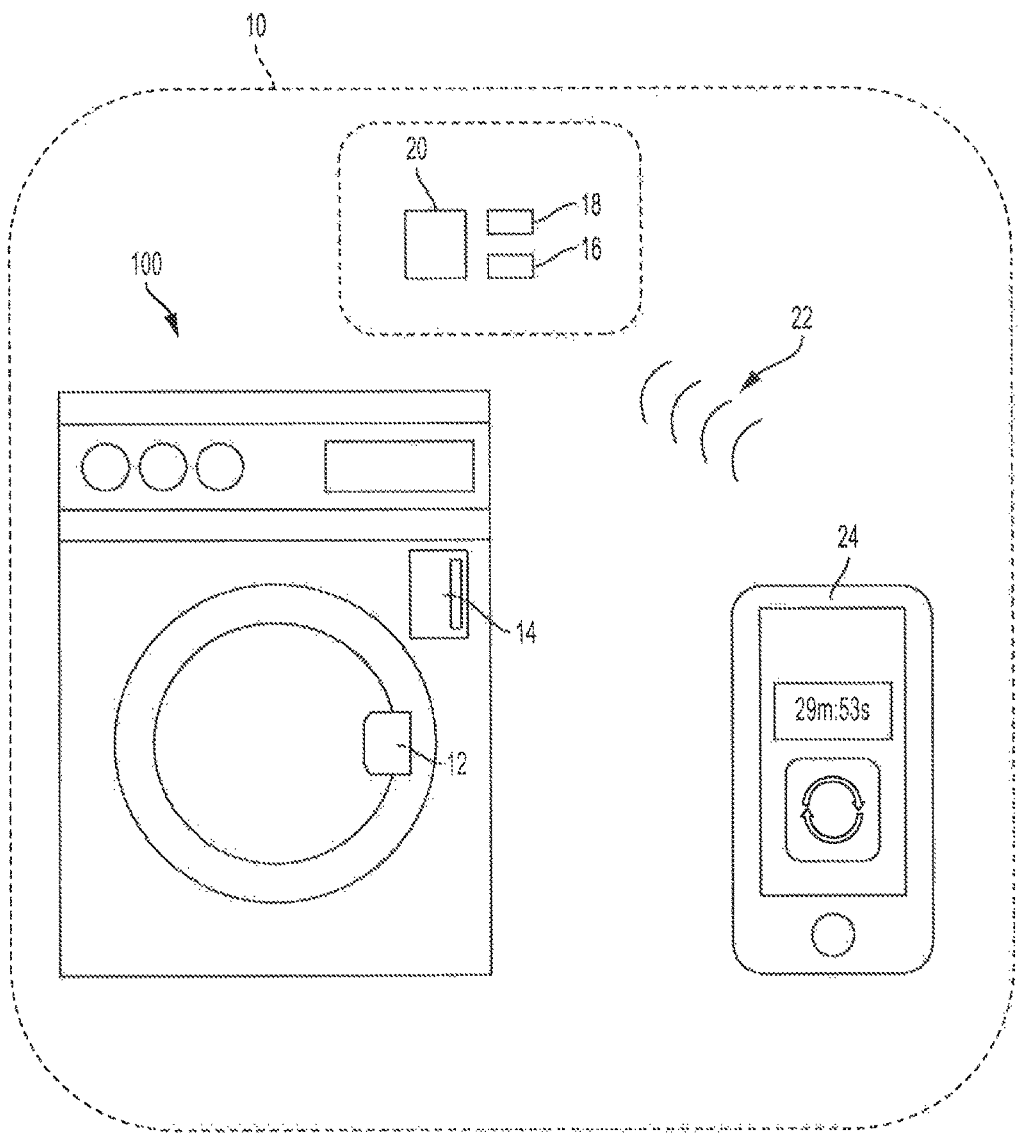
FIG. 1, FIG. 2, and FIG. 3 illustrate general examples of an integrated locking system according to aspects of the present disclosure.

Reference will not be made in detail to the embodiments of the present disclosure, examples of which are illustrated in the accompanying drawings, wherein like reference numerals refer to like elements throughout.

In one embodiment, the invention encompasses an integrated locking system 10, that can be operatively connected to a communal appliance machine, and can be used to maximize the resources provided by these appliances. In certain embodiments, the integrated locking system 10 provides an added layer of security for users by securing the users belongings within the appliance until the user actually returns to retrieve his or her belongings. In certain embodiments, the appliance can include, but is not limited to, a washing machine, a drying machine, a microwave, or any appliance where a user places his or her belonging in the appliance. In certain embodiments, these appliances are distributed in a communal setting, for example, a laundromat, a communal kitchen, or a laundry room in a hotel, dormitory, apartment building. In certain embodiments, these appliances are well known in the art and are not illustrated separately. For ease of understanding only, the integrated locking system 10 will be described for use in connection with a washing machine 100.

Figure 2:
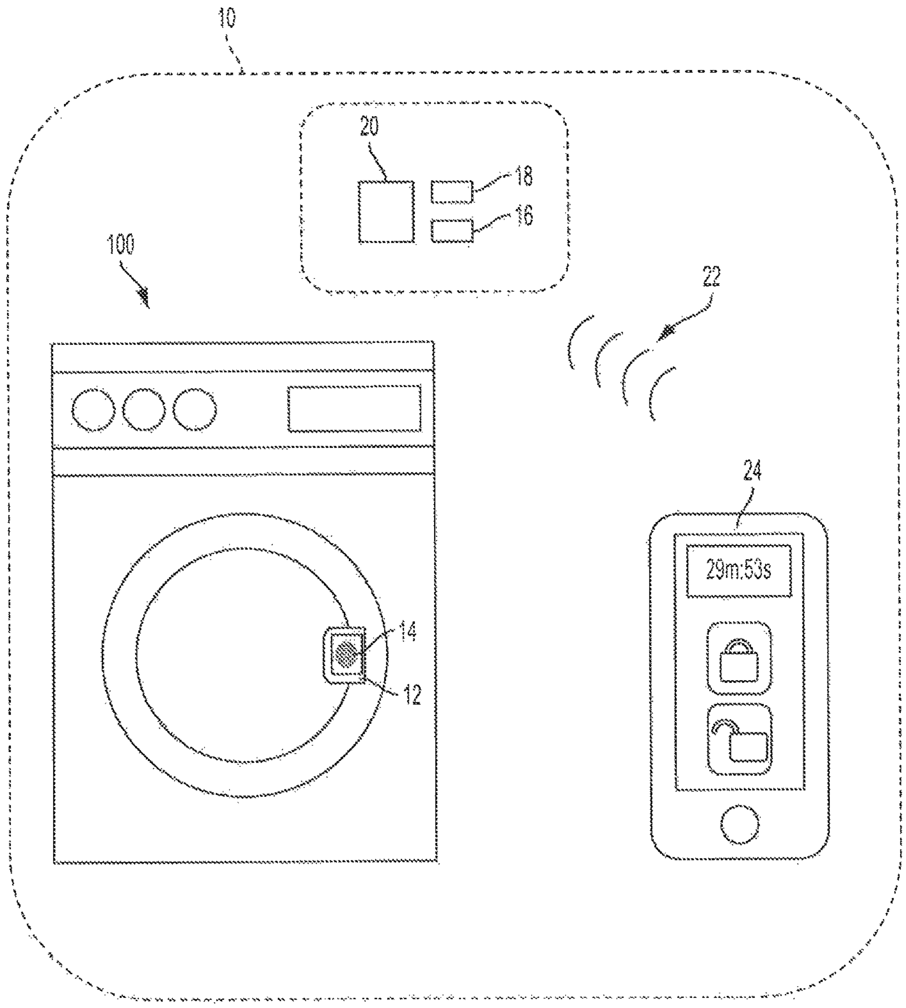
Figure 3:
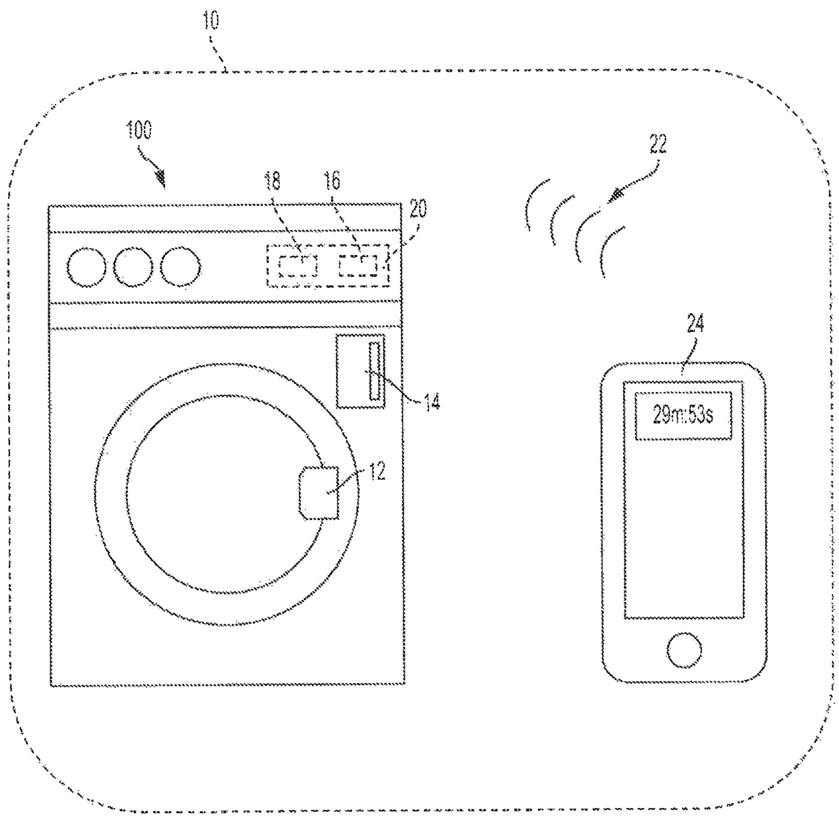

Referring to FIG. 1, FIG. 2, and FIG. 3, the integrated locking system 10 includes a locking mechanism 12, a user information reader 14, a wireless notification module 16, and a payment card charging module 18. In certain embodiments, the locking mechanism 12 is associated with a door of the washing machine 100. In certain embodiments, the locking mechanism 12 may be configured to hold the door of the washing machine 100 mechanically closed until an unlock signal is received by the locking mechanism (i.e. in a locked state). In certain embodiments, the locking mechanism 12 may also be configured to allow the door to open and close freely until a lock signal is received by the locking mechanism (e.g., in an unlocked state). In certain embodiments, physical structures of locking mechanisms 12 are well known in the art and are not separately illustrated. In certain embodiments, while the locking mechanism 12 is the unlocked state, it allows a user to place his or her belongings into the washing machine 100 and utilize the washing machine's 100 washing capabilities.

In another embodiment, the locking mechanism 12 is controlled by a processor 20. In certain embodiments, the processor 20 is communicatively linked to the locking mechanism 12, the user information reader 14, the wireless notification module 16, the payment card charging module 18, one or more external communication devices 24, or the communal appliance machine (e.g., washing machine 100), or a combination thereof. In certain embodiments, the processor 20 may be integrated into the appliance, as indicated in FIG. 3, or it can be part of a separate structure, as shown in FIG. 1 and FIG. 2. In certain embodiments, the processor 20 can perform a number of functions associated with operation of the integrated locking system 10. In certain embodiments, the processor 20 may be configured to receive user information or payment card information associated with the user information from the user information reader 14. In certain embodiments, once the user information has been received, the processor 20 may be configured to send a lock signal to the locking mechanism 12 when the user information is received while the locking mechanism 12 is in an unlocked state. Accordingly, the locking mechanism 12 may enter into a locked state.

In other embodiments, the user information may be received by the user information reader 14 by having a user, who wishes to use the communal appliance machine, submit a user information card to the user information reader 14. In certain embodiments, the user information reader 14 associated with the locking mechanism 12 can be integrated into the locking mechanism 12, as shown in FIG. 2, or the user information reader 14 may be a separate structure on the appliance, as shown in FIG. 1 and FIG. 3, or a structure that is not a part of the appliance (not shown). In certain embodiments, a number of different types of user information readers 14 can be employed with the system 10. In certain embodiments, user information readers 14 may include, but are not limited to, an identification card reader, a contact payment card reader configured to interface with contact-type device, a wireless payment card reader configured to interface with wireless device, a magnetic stripe payment card reader configured to interface with a magnetic stripe device, or a combined payment card reader. In certain embodiments, a combined user information reader is designed to interface with any type of device. In certain embodiments, the user information reader 14 may be configured to store payment card information as the user information.

In certain embodiments, payment cards are examples of a variety of payment devices that can be employed. In certain embodiments, the primary function of the payment devices may not be payment, for example, the payment device can include cellular phone handsets. Such devices could include cards having a conventional form factor, smaller or larger cards, cards of different shape, key fobs, personal digital assistants (PDAs) or tablets, appropriately configured cell phone handsets, or indeed any device with the appropriate capabilities. In certain embodiments, the cards, or other payment devices, can include body portions (e.g., laminated plastic layers of a payment card, case or cabinet of a PDA, chip packaging, and the like), memories associated with the body portions, and processors associated with the body portions and coupled to the memories. In certain embodiments, the memories can contain appropriate applications. In certain embodiments, the processors can be operative to implement appropriate functionality.

In another embodiment, the user information reader 14 may be a biometric reader configured to receive biometric data, including, but not limited to, a fingerprint of a user, as indicated in FIG. 2. In certain embodiments, the biometric data of the user may be used as the user information by the user information reader 14. In certain embodiments, the processor 20 may be configured to store the received biometric information until the payment card has been charged via the payment card charging module 18 or use of the communal appliance machine has otherwise been completed.

In other embodiments, once the user information has been stored, an operation of the washing machine 100 can be initiated by the processor 20. In certain embodiments, the wireless notification module 16 is configured to determine a current operating state of the washing machine. In certain embodiments, the current operating state of the washing machine may be an active cycle, wherein the washing machine is currently operating, and a storage state, wherein the washing machine is not currently operating. In certain embodiments, the current operating state of the washing machine may also be an amount of time remaining until a current active cycle (e.g., laundering cycle) is complete. In certain embodiments, the wireless notification module 16 is configured to notify the one or more external communication devices 24 of the current operating state of the laundry machine 100. In certain embodiments, the wireless notification module 16 may be configured to notify the one or more external communication devices 24 when there is a change in the operating state of the communal appliance machine. Illustrative, non-limited examples of the external communication devices 24 include, but are not limited to, cell phones, smartphones, laptops, desktops, online interfaces, and the like. In certain embodiments, the wireless notification module 16 may be connected to the external communication devices 24 via a wireless network 22.

According to a further embodiment of the invention, the integrated locking system 10 may be used in conjunction with one or more external communication devices 24. To accomplish this, the external communication device 24 may have an application that stores payment card information or user information. In certain embodiments, the application is capable of communicating with the integrated locking system 10. In certain embodiments, the application may be capable of receiving a user input using the external communication device 24. Exemplary inputs include, but are not limited to, initiating an additional active cycle of the appliance, requesting an additional notification after completion of an active cycle, or locking or unlocking the appliance, or combinations thereof.

In certain embodiments, the wireless network 22 could be unidirectional or bidirectional electronic communication through wireless configuration. Illustrative, non-limiting examples of wireless networks 22 include, but are not limited to, radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, and other communication networks of the type.

In another embodiment, the processor may be configured to determine an amount of time until the user information that matches the user information stored by the system is received again (i.e., the amount of time the users belongings are stored in the machine). In certain embodiments, once the user information that matches the stored information is received while the locking mechanism 12 is in the locked state, the processor 20 is configured to send an unlock signal to the locking mechanism 12, which then enters into the unlocked state. In certain embodiments, an added layer of security for users is provided by keeping the locking mechanism 12 in a locked state and preventing access to the items until matching user information is received. In certain embodiments, the processor 20 may be configured to send an unlock signal to the locking mechanism 12 in other situations as well. As an illustrative example, the owner of the appliance may have a locking mechanism override that causes the processor 20 to send an unlock signal to the locking mechanism 12 when the owner uses the override. In certain embodiments, the override may be, but is not limited to, a physical key, a key card, a payment card, or a signal from an external communication device.

In other embodiments, the processor 20 may be configured to generate the use information of the washing machine. In certain embodiments, the use information of the washing may include a number of completed active cycles by the washing machine and the determined amount of time between the completion of an active cycle and when the payment card information is received to unlock the locking mechanism. In certain embodiments, the processor 20 may also be configured to forward the use information of the washing machine to the payment card charging module 18.

In certain embodiments, the payment card charging module 18 is configured to charge a payment card associated with the user information received by the user information reader 14. In certain embodiments, the charging of the payment card is based on the determined use information from the processor 20. In certain embodiments, the payment card can be charged based on a flat fee for each completed active cycle. In certain embodiments, the payment card can be charged on a continuous basis based on the determined amount of time between the completion of a cycle and when the payment card information is received to unlock the locking mechanism. In certain exemplary embodiments, for every one, five, or ten minute interval after the completion of an active cycle, the payment card may be charged an additional amount of money. In certain embodiments, the additional charge and the additional time needed to accrue that charge may be determined by an owner of the machine. In certain embodiments, this allows the owner to maximize the profitability of the appliances should a user forget they are occupying the appliance. In certain embodiments, this allows the owner to charge rent to the user rather than losing the ability to make money due to the occupation of the appliance.

According to embodiments of the invention, the integrated locking system 10 may be a built-in system for an appliance. In certain embodiments, the integrated locking system 10 may be an aftermarket system that can be added to an appliance after production of the appliance.

Figure 4:
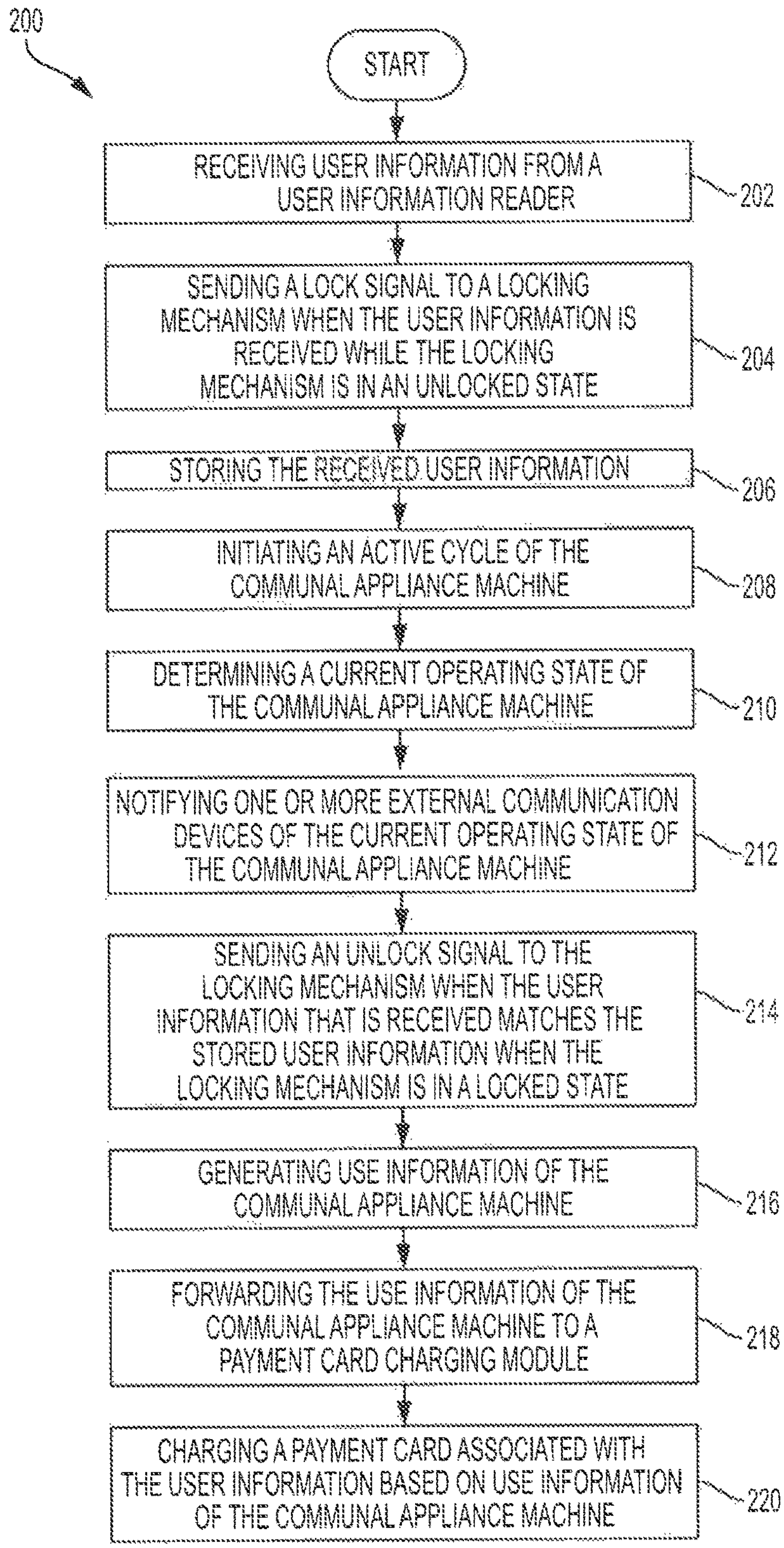
FIG. 4 is a process flow diagram illustrating a method for operating a communal appliance machine according to another aspect of the present disclosure.

Another embodiment encompasses a method for operating a communal appliance machine described with reference to FIG. 4. In certain embodiments, the method 200 includes receiving user information from a user information reader at block 202. At block 204, the method 200 includes sending a lock signal to a locking mechanism when the user information is received while the locking mechanism is in an unlocked state. At block 206, the method includes storing the received user information. In certain embodiments, the received user information may be stored by a processor within an integrated locking system. In certain embodiments, at block 208, the method includes initiating an active cycle of the communal appliance machine. The active cycle may be initiated by the processor within the integrated locking system.

At block 210, the method includes determining a current operating state of the communal appliance machine. In certain embodiments, the current operating state of the communal appliance machine may be determined by a wireless notification module. In addition, the method includes notifying one or more external communication devices of the current operating state of the communal appliance machine at block 212. In certain embodiments, the wireless notification module may also be configured to notify one or more external communication devices of the operating state of the communal appliance machine. In certain embodiments, the current operating state of the communal appliance machine may be an active cycle, where the machine is currently operating, or a storage state, where the machine is not operating.

Further, at block 214, the method includes sending an unlock signal to the locking mechanism when the user information that is received matches the stored user information when the locking mechanism is in a locked state. In certain embodiments, the method also includes, at block 216, generating use information of the communal appliance machine. In certain embodiments, the use information may be, but is not limited to, a number of completed cycles of the machine and an amount of time between a completed cycle and when the unlock signal is sent to the locking mechanism.

In another embodiment, at block 218, the method includes forwarding the use information of the communal appliance machine to a payment card charging module. In certain embodiments, at block 220, the method includes charging a payment card associated with the user information based on use information of the communal appliance machine. In certain embodiments, the payment card may be charged by the payment card charging module. In another embodiment, the method includes recording the use information of the communal appliance machine associated with the user information. In certain embodiments, the use information may be recorded by the payment card charging module.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular configurations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. An integrated locking system operatively connected to a communal appliance machine, comprising:

a locking mechanism associated with a communal appliance machine configured to hold the communal appliance machine closed until an unlock signal is received when in a locked state and allow the communal appliance machine to open freely until a lock signal is received when in an unlocked state;

a user information reader associated with the locking mechanism configured to receive user information;

a wireless notification module configured to determine a current operating state of the communal appliance machine and notify one or more external communication devices of the current operating state of the communal appliance machine;

a processor communicatively linked to the locking mechanism, the user information reader, and the wireless notification module, the processor configured to:

receive user information from the user information reader; send a lock signal to the locking mechanism when the user information is received while the locking mechanism is in an unlocked state;

initiate an active cycle of the communal appliance machine;

generate the use information of the communal appliance machine while associated with the user information; and forward the use information of the communal appliance machine to the wireless notification module, wherein the current operating state of the communal appliance machine comprises: an active cycle, wherein the communal appliance machine is currently operating; and a storage state, wherein the communal appliance machine is not currently operating, and wherein the use information of the communal appliance machine comprises a number of active cycles completed by the communal appliance machine while associated with the user information and an amount of time the communal appliance machine is in the storage state before an unlock signal is sent by the processor while associated with the user information.

2. The integrated locking system of claim 1, wherein the current operating state of the communal appliance machine further comprises a remaining amount of time in a current active cycle of the communal appliance machine.

3. The integrated locking system of claim 1, wherein the wireless notification module is further configured to notify one or more external communication devices when there is a change in the operating state of the communal appliance machine.

4. The integrated locking system of claim 1, wherein the user information from the user information reader is stored.

5. The integrated locking system of claim 4, wherein the processor will keep the locking mechanism in a locked state until user information matching the stored user information is received.

6. The integrated locking system of claim 1, wherein the communal appliance machine is selected from the group consisting of a washing machine, a dryer, a combined washing machine and dryer, and a microwave.

7. The integrated locking system of claim 1, wherein the user information reader is a biometric data reader and the user information is biometric data from a user.

8. An integrated locking system operatively connected to a communal appliance machine, comprising:

a locking mechanism associated with a communal appliance machine configured to hold the communal appliance machine closed until an unlock signal is received when in a locked state and allow the communal appliance machine to open freely until a lock signal is received when in an unlocked state;

a user information reader associated with the locking mechanism configured to receive user information or payment card information;

a wireless notification module configured to determine a current operating state of the communal appliance machine and notify one or more external communication devices of the current operating state of the communal appliance machine;

a payment card charging module configured to charge fees to a payment card associated with the payment card information; and a processor communicatively linked to the locking mechanism, the user information reader, the wireless notification module, and the payment card charging module, the processor configured to:

receive payment card information from the user information reader;

store the received payment card information;

send a lock signal to the locking mechanism when the payment card information is received while the locking mechanism is in an unlocked state;

initiate an active cycle of the communal appliance machine;

generate the use information of the communal appliance machine while associated with the user information;

forward the use information of the communal appliance machine to the wireless notification module;

forward the use information of the communal appliance machine to the payment card charging module; and send an unlock signal to the locking mechanism when the payment card information that is received matches the stored payment card information when the locking mechanism is in a locked state, wherein the current operating state of the communal appliance machine comprises: an active cycle, wherein the communal appliance machine is currently operating; and a storage state, wherein the communal appliance machine is not currently operating, and wherein the use information of the communal appliance machine comprises a number of active cycles completed by the communal appliance machine while associated with the user information and an amount of time the communal appliance machine is in the storage state before an unlock signal is sent by the processor while associated with the user information.

9. The integrated locking system of claim 8, wherein the current operating state of the communal appliance machine further comprises a remaining amount of time in a current active cycle of the communal appliance machine.

10. The integrated locking system of claim 8, wherein the wireless notification module is further configured to notify one or more external communication devices when there is a change in the operating state of the communal appliance machine.

11. The integrated locking system of claim 8, wherein the payment card charging module charges a fee to the payment card associated with the payment card information based on use information of the communal appliance machine.

12. The integrated locking system of claim 8, wherein the communal appliance machine is selected from the group consisting of a washing machine, a dryer, a combined washing machine and dryer, and a microwave.

13. A laundry machine comprising an integrated laundry machine locking system, comprising:

a locking mechanism associated with a laundry machine configured to hold the laundry machine closed until an unlock signal is received when in a locked state and allow the laundry machine to open freely until a lock signal is received when in an unlocked state;

a user information reader associated with the locking mechanism configured to receive user information or payment card information;

a wireless notification module configured to determine a current operating state of the laundry machine and notify one or more external communication devices of the current operating state of the laundry machine;

a payment card charging module configured to charge fees to a payment card associated with the payment card information based on use information of the laundry machine; and a processor communicatively linked to the locking mechanism, the user information reader, the wireless notification module, and the payment card charging module, the processor configured to:

receive payment card information from the user information reader;

store the received payment card information;

send a lock signal to the locking mechanism when the user information is received while the locking mechanism is in an unlocked state;

initiate an active cycle of the laundry machine;

generate the use information of the laundry machine while associated with the stored payment card information;

forward the use information of the laundry machine to the wireless notification module;

forward the use information of the laundry machine to the payment card charging module; and send an unlock signal to the locking mechanism when the payment card information that is received matches the stored payment card information when the locking mechanism is in a locked state;

wherein the current operating state of the laundry machine, comprises:

an active cycle, wherein the laundry machine is currently operating;

a storage state, wherein the laundry machine is not currently operating; or an amount of time remaining until a current operation cycle is complete; and wherein the use information comprises a number of active cycles completed by the laundry machine while associated with the stored payment card information or an amount of time the laundry machine is in the storage state before an unlock signal is sent by the processor while associated with the stored payment card information.

14. The laundry machine of claim 13 wherein the wireless notification module is further configured to notify one or more external communication devices when there is a change in the operating state of the laundry machine.

15. The laundry machine of claim 13, wherein the payment card charging module charges a fee to the payment card associated with the payment card information based on use information of the laundry machine.

16. The laundry machine of claim 15, wherein the use information of the laundry machine comprises the amount of time the laundry machine is in the storage state before an unlock signal is sent by the processor.

17. The laundry machine of claim 13 wherein the laundry machine is selected from the group consisting of a washing machine, a dryer, and a combined washing machine and dryer.

18. The laundry machine of claim 13, wherein the user information reader is a biometric data reader and the user information is biometric data from a user.

19. The laundry machine of claim 13, wherein the user information reader is a biometric data reader and the user information is biometric data from a user.

* * * * *